United States Patent [19]
Nguyen

[11] Patent Number: 5,574,424
[45] Date of Patent: Nov. 12, 1996

[54] ANTI-CAR JACKING/THEFT DEVICE

[76] Inventor: Duc M. Nguyen, 8530 Bauer Dr., Springfield, Va. 22152

[21] Appl. No.: 239,573

[22] Filed: May 9, 1994

[51] Int. Cl.$^6$ .................................................. B60R 25/10
[52] U.S. Cl. ........................ 340/426; 340/666; 307/10.1; 180/287
[58] Field of Search ................................... 340/426, 427, 340/428, 429, 430, 568, 666; 307/10.1, 10.2, 10.3, 10.4; 180/287; 177/1, 45, 50; 109/7, 23; 235/431

[56] References Cited

U.S. PATENT DOCUMENTS

| | | | |
|---|---|---|---|
| 3,726,238 | 4/1973 | Gordon | 109/2 |
| 3,750,158 | 7/1973 | Anastassakis | 340/568 |
| 3,898,472 | 8/1975 | Long | 340/573 |
| 3,943,376 | 3/1976 | Long | 307/116 |
| 4,262,277 | 4/1981 | Abonia | 340/426 |
| 4,754,255 | 6/1988 | Sanders et al. | 340/430 |
| 4,757,304 | 7/1988 | Rho | 340/426 |
| 4,866,661 | 9/1989 | de Prins | 364/900 |
| 4,876,649 | 10/1989 | Kawai et al. | 340/426 |
| 5,041,815 | 8/1991 | Newton | 340/568 |
| 5,123,494 | 6/1992 | Schneider | 177/50 |
| 5,125,465 | 6/1992 | Schneider | 177/50 |
| 5,319,351 | 6/1994 | Beesley | 340/426 |

*Primary Examiner*—Brent A. Swarthout
*Assistant Examiner*—Niner Tong

[57] ABSTRACT

An anti-car jacking/theft device for detecting an unauthorized person who is attempting to operate a vehicle and activating an alarm including a measurement mechanism adapted to be coupled to a driver's seat of a vehicle for transmitting an input weight signal indicating a person's weight; a key receiving mechanism adapted for receiving a user-supplied key and transmitting a reset signal when the key is activated, a set signal when the key is de-activated, and a key status ready signal having one mode indicating that the key receiving mechanism is active and another mode indicating that the key means is inactive; control circuitry for receiving the input weight signal from the measurement means and the reset signal, set signal, and key status ready signal from the key receiving means, comparing the input weight signal with a resident reference weight signal and a resident input threshold signal with the control circuitry having one mode for transmitting an alarm command signal indicating that an unauthorized weight is detected at the measurement means and another mode for transmitting an alarm command indicating that the key receiving means is inactive; alarm mechanism for receiving the alarm command signal and activating an alarm; and a power source for energizing and de-energizing the measurement circuitry, key receiving circuitry, and control circuitry.

2 Claims, 6 Drawing Sheets

ANTI-CAR JACKING/THEFT DEVICE

BACKGROUND OF THE INVENTION

1. Field of the Invention

The present invention relates to an anti-car jacking/theft device and more particularly pertains to detecting an unauthorized person who is attempting to operate a vehicle and sounding an alarm with an anti-car jacking/theft device.

2. Description of the Prior Art

The use of vehicular security and alarm systems is known in the prior art. More specifically, vehicular security and alarm systems heretofore devised and utilized for the purpose of detecting unauthorized use of vehicles are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,726,238 to Gordon discloses a security system. U.S. Pat. No. 3,750,158 to Anastassakis discloses a weight sensitive security system. U.S. Pat. No. 5,041,815 to Newton discloses a golf bag security alarm system. U.S. Pat. No. 5,123,494 to Schneider discloses an anti-theft weighing system. U.S. Pat. No. 5,125,465 to Schneider discloses a fast retail security weighing system.

While these devices fulfill their respective, particular objective and requirements, the aforementioned patents do not describe an anti-car jacking/theft device that contains key-activated circuitry that compares user input weights to known user input weight values and outputs alarm indications if the user input weights do not correspond with the known user input weights.

In this respect, the anti-car jacking/theft device according to the present invention substantially departs from the conventional concepts and designs of the prior art, and in doing so provides an apparatus primarily developed for the purpose of detecting an unauthorized person who is attempting to operate a vehicle and sounding an alarm.

Therefore, it can be appreciated that there exists a continuing need for new and improved anti-car jacking/theft device which can be used for detecting an unauthorized person who is attempting to operate a vehicle and sounding an alarm. In this regard, the present invention substantially fulfills this need.

SUMMARY OF THE INVENTION

In the view of the foregoing disadvantages inherent in the known types of vehicular security and alarm systems now present in the prior art, the present invention provides an improved anti-car jacking/theft device. As such, the general purpose of the present invention, which will be described subsequently in greater detail, is to provide a new and improved anti-car jacking/theft device and method which has all the advantages of the prior art and none of the disadvantages.

To attain this, the present invention essentially comprises, in combination, measurement circuitry adapted to be coupled to a driver's seat of a vehicle for transmitting an input weight signal indicating a person's weight when a person sits on the driver's seat. Key receiving circuitry is included and adapted for receiving a user-supplied key and transmitting a reset signal when the key is coupled therewith, a set signal when the key is de-coupled therefrom, and a key status ready signal having one mode indicating that the key means is active and another mode indicating that the key means is inactive. Control circuitry is included for receiving the input weight signal from the measurement means and the reset signal, set signal, and key status ready signal from the key receiving means, comparing the input weight signal with a resident reference weight signal and a resident input threshold signal with the control circuitry having one mode for transmitting an alarm command signal indicating that an unauthorized weight is detected at the measurement means and another mode for transmitting an alarm command indicating that the key receiving means is inactive. The control circuitry further includes read-only-memory circuitry, arithmetic circuitry, inverter circuitry, comparator circuitry, first and second conjunctive circuitry, counter circuitry, and selection circuitry. The read-only-memory circuitry is used for receiving and storing an input threshold signal and an input weight signal as a reference weight signal with the read-only-memory circuitry having one mode for transmitting the reference weight signal based on the receipt of a set signal and another mode for transmitting the reference weight signal based on the receipt of a reset signal. The arithmetic circuitry is used for receiving the input weight signal and reference weight signal and transmitting a weight difference signal based on the absolute difference between the input weight signal and reference weight signal. The inverter circuitry is used for receiving the reset signal, the set signal, and the key status ready signal and transmitting an inverted reset signal, an inverted set signal, and an inverted key status signal. The comparator circuitry is used for receiving the input threshold signal, comparing the level of the input threshold signal to the levels of the input weight signal and the weight difference signal, and transmitting a first indication signal and a second indication signal based on the comparisons. The first conjunctive circuitry is used for receiving the first indication signal and the second indication signal and transmitting a first conjunctive indication signal based on the levels of the first indication signal and the second indication signal. The second conjunctive circuitry has one mode for receiving the first indication signal and the inverted reset signal and transmitting a second conjunctive indication signal based on the levels of the first indication signal and the inverted reset signal and another mode for receiving the first indication signal and the inverted set signal and transmitting a second conjunctive indication signal based on the levels of the first indication signal and the inverted set signal. The counter circuitry is used for receiving the second conjunctive indication signal and transmitting a detection signal provided the second conjunctive signal is received for a given period of time. The selection circuitry is used for receiving the detection signal and inverted key status signal with the selection circuitry having one mode for transmitting an alarm command signal when the detection signal is received, whereby indicating that an unauthorized weight is detected at the measurement means, and another mode for transmitting an alarm command signal when an inverted key status signal is received, whereby indicating that the key receiving means is inactive. An alarm means is included for receiving the alarm command signal and activating an alarm. A power source is included for energizing the measurement circuitry, key receiving circuitry, and control circuitry.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved anti-car jacking/theft device which has all the advantages of the prior art vehicular security and alarm systems and none of the disadvantages.

It is another object of the present invention to provide a new and improved anti-car jacking/theft device which may be easily and efficiently manufactured and marketed.

It is a further object of the present invention to provide a new and improved anti-car jacking/theft device which is of durable and reliable construction.

An even further object of the present invention is to provide a new and improved anti-car jacking/theft device which is susceptible of a low cost of manufacture with regard to both materials and labor, and which accordingly is then susceptible of low prices of sale to the consuming public, thereby making such an anti-car jacking/theft device economically available to the buying public.

Still yet another object of the present invention is to provide a new and improved anti-car jacking/theft device which provides in the apparatuses and methods of the prior art some of the advantages thereof, while simultaneously overcoming some of the disadvantages normally associated therewith.

Even still another object of the present invention is to provide a new and improved anti-car jacking/theft device for detecting an unauthorized person who is attempting to operate a vehicle and sounding an alarm.

Lastly, it is an object of the present invention to provide a new and improved anti-car jacking/theft device comprising measurement means adapted to be coupled to a driver's seat of a vehicle for transmitting an input weight signal indicating a person's weight; key receiving means adapted for receiving a user-supplied key and transmitting a reset signal when the key is activated, a set signal when the key is de-activated, and a key status ready signal having one mode indicating that the key means is active and another mode indicating that the key means is inactive; control circuitry for receiving the input weight signal from the measurement means and the reset signal, set signal, and key status ready signal from the key receiving means, comparing the input weight signal with a resident reference weight signal and a resident input threshold signal with the control circuitry having one mode for transmitting an alarm command signal indicating that an unauthorized weight is detected at the measurement means and another mode for transmitting an alarm command indicating that the key receiving means is inactive; alarm means for receiving the alarm command signal and activating an alarm; and a power source for energizing and de-energizing the measurement circuitry, key receiving circuitry, and control circuitry.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
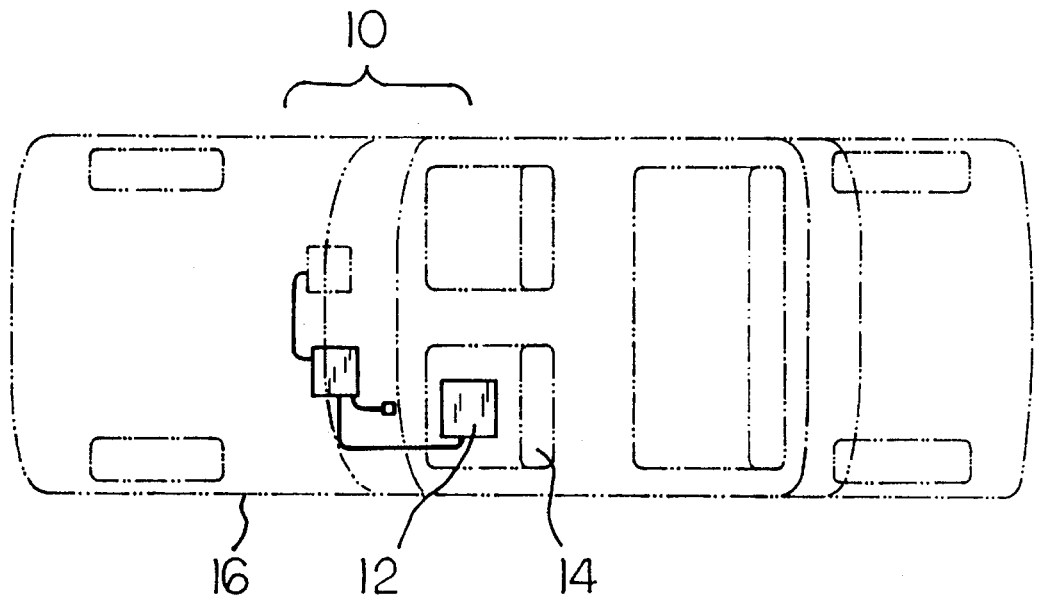
FIG. 1 is a plan view of the preferred embodiment of the anti-car jacking/theft device constructed in accordance with the principles of the present invention positioned within a vehicle.
Figure 2:
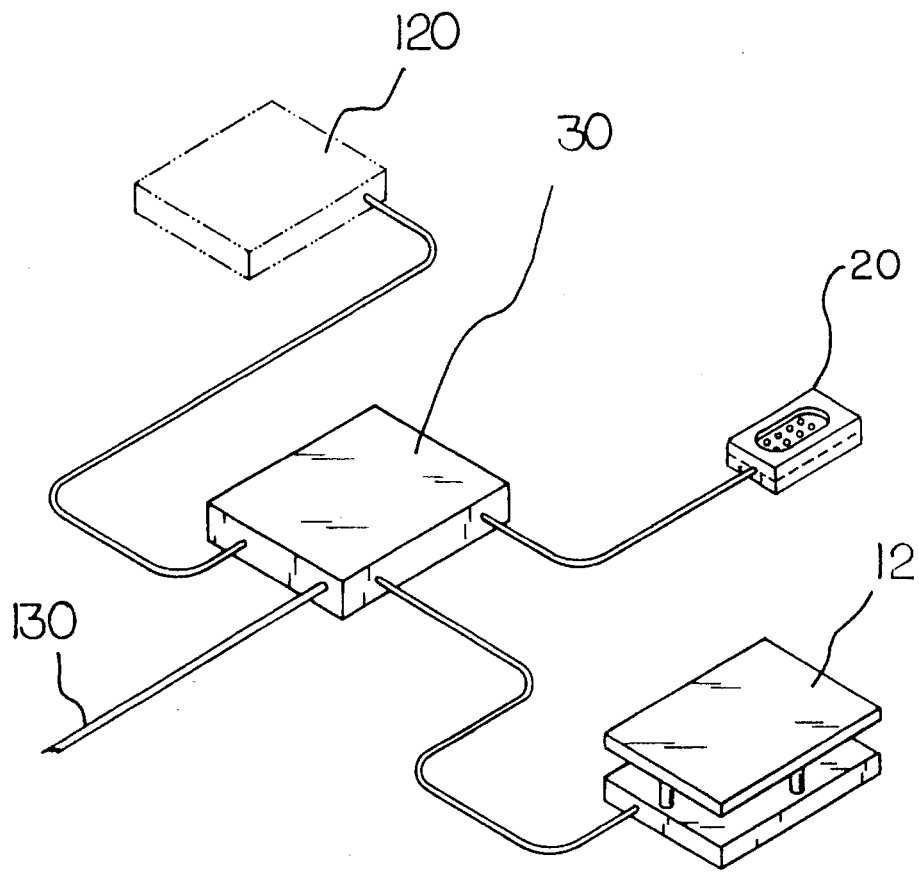
FIG. 2 is a perspective view of the anti-car jacking/theft device constructed in accordance with the principles of the present invention.
Figure 3:
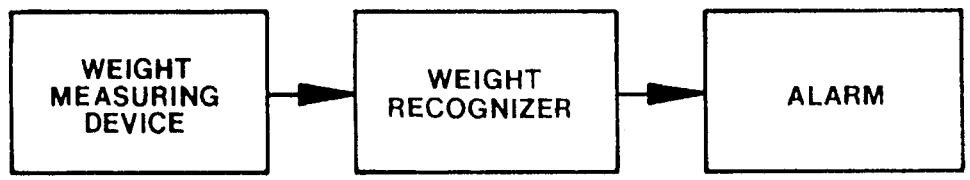
FIG. 3 depicts a functional block diagram of the present invention. The weight measuring device functional block contains the measurement means. The weight recognizer functional block contains the key receiving circuitry and the control circuitry. The alarm functional block contains the alarm means.

With reference now to the drawings, and in particular, to FIG. 1 thereof, the preferred embodiment of the new and improved anti-car jacking/theft device embodying the principles and concepts of the present invention and generally designated by the reference number 10 will be described.

Specifically, the present invention includes six major components. The major components are the measurement circuitry, key receiving circuitry, control circuitry, alarm means, power transmission means, and switch means. These components are interrelated to provide the intended function.

More specifically, it will be noted in the various Figures that the first major component is the measurement circuitry 12. The measurement circuitry is adapted to be coupled to a driver's seat 14 of a vehicle 16. The measurement circuitry transmits an input weight signal 18 indicating a person's weight when a person sits on the driver's seat.

The second major component is the key receiving circuitry 20. The key receiving circuitry is adapted for receiving a user-supplied key 22. The key receiving circuitry transmits a reset signal 24 when the key is coupled therewith. The key receiving circuitry transmits a set signal 26 when the key is decoupled therefrom. The key receiving circuitry also transmits a key status ready signal 28. The key status ready signal has one mode indicating that the key receiving circuitry is active and another mode indicating that the key receiving circuitry is inactive. An inactive condition can occur when the communication path between the control circuitry and key receiving circuitry is severed or disrupted.

The third major component is the control circuitry 30. The control circuitry is adapted to receive the input weight signal 18 from the measurement circuitry 12. It is also adapted to receive the reset signal 24, the set signal 26, and the key status ready signal 28 from the key receiving circuitry 20. The control circuitry compares the input weight signal with a resident reference weight signal 30 and a resident input threshold signal 32. The control circuitry has one mode for transmitting an alarm command signal 34 which indicates that an unauthorized weight is detected at the measurement circuitry. The control circuitry also has another mode for transmitting an alarm command signal indicating that the key receiving circuitry is inactive. The control circuitry includes eight subcomponents. The subcomponents are the read-only-memory circuitry, arithmetic circuitry, inverter circuitry, comparator circuitry, first conjunctive circuitry, second conjunctive circuitry, counter circuitry, and selection circuitry. These subcomponents are interrelated to provide the intended function.

The first subcomponent of the control circuitry is the read-only-memory circuitry 40. The read-only-memory circuitry is adapted for receiving and storing an input threshold signal 32 and an input weight signal as a reference weight signal 30. The read-only-memory circuitry has one mode for transmitting the reference weight signal based on the receipt of a set signal 26. The read-only-memory circuitry has another mode for transmitting the reference weight signal based on the receipt of a reset signal 24.

The second subcomponent of the control circuitry is the arithmetic circuitry 50. The arithmetic circuitry is adapted for receiving the input weight signal 18 and reference weight signal 30. The arithmetic circuitry transmits a weight difference signal 52 based on the absolute difference between the input weight signal and the reference weight signal.

The third subcomponent of the control circuitry is the inverter circuitry 60. The inverter circuitry is adapted for receiving the reset signal 24, the set signal 26, and the key status ready signal 28. The inverter circuitry transmits an inverted reset signal 62, and inverted set signal 64, and an inverted key status signal 66.

The fourth subcomponent of the control circuitry is the comparator circuitry 70. The comparator circuitry is adapted to receive the input threshold signal 32. The comparator circuitry compares the level of the input threshold signal to the levels of the input weight signal 18 and the weight difference signal 52. The comparator circuitry then transmits a first indication signal 72 and a second indication signal 74 based on these comparisons.

The fifth subcomponent of the control circuitry is the first conjunctive circuitry 80. The first conjunctive circuitry is adapted for receiving the first indication signal 72 and the second indication signal 74. The first conjunctive circuitry transmits a first conjunctive indication signal 82 based on the levels of the first indication signal and the second indication signal.

The sixth subcomponent of the control circuitry is the second conjunctive circuitry 90. The second conjunctive circuitry has one mode for receiving the first conjunctive indication signal 82 and the inverted reset signal 62. The second conjunctive circuitry transmits a second conjunctive indication signal 92 based on the levels of the first conjunctive indication signal and the inverted reset signal. The second conjunctive circuitry has another mode for receiving the first conjunctive indication signal and the inverted set signal 64. The second conjunctive circuitry transmits a second conjunctive indication signal based on the levels of the first indication signal and the inverted set signal.

The seventh subcomponent of the control circuitry is the counter circuitry 100. The counter circuitry is adapted for receiving the second conjunctive indication signal 92. The counter circuitry transmits a detection signal 102 provided the second conjunctive indication signal is received for a given period of time.

The eighth subcomponent of the control circuitry is the selection circuitry 110. The selection circuitry is adapted for receiving the detection signal 102 and the inverted key status ready signal 28. The selection circuitry has one mode for transmitting an alarm command signal 34 when the detection signal is received, whereby indicating that an unauthorized weight is detected at the measurement circuitry. The selection circuitry has another mode for transmitting an alarm command signal when an inverted key status ready signal is received, whereby indicating that the key receiving circuitry is inactive. This inactive condition could be caused by a person cutting the transmission line between the key receiving circuitry and the control circuitry.

The fourth major component is the alarm means 120. The alarm means is adapted for receiving the alarm command signal 34. The alarm means may activate an alarm or trigger supplementary commands for other alarm systems.

The fifth major component is the power transmission means 130. The power transmission means is used to provide energy to the measurement circuitry 12, key receiving circuitry 20, and control circuitry 30. The power transmission means is adapted to be coupled to a power source within a vehicle such as the alternator or battery.

The sixth major component is the S/R connector set means 20.

The S/R connector can be replaced with a key and lock set. Thus, the lock has 2 positions: Set and Reset, and the key can be turned to either one of these positions, accordingly to its proper use. A key and lock set appears more friendly to a user than the connectors, but also creates a chance for a thief to bypass the device as long as he is capable of turning the lock into the reset mode.

In the preferred embodiment, the objective of the present invention device is to detect an unauthorized person who is currently engaged in a process of accessing the operation of a vehicle. The feature which is used for detection in the system is the weight of a person. Weight recognition is a simple feature to employ for use in identifying a person at a low cost. If the measurement by the system does not match a pre-stored weight or weight in a specified range, a alarm command signal will be activated.

The present invention can be used generally in any security/alarming system to detect and prevent unauthorized people from accessing a vehicle. In addition, the performance of detection rates will be improved when the device is used in conjunction with other detection and recognition systems.

Figure 4:
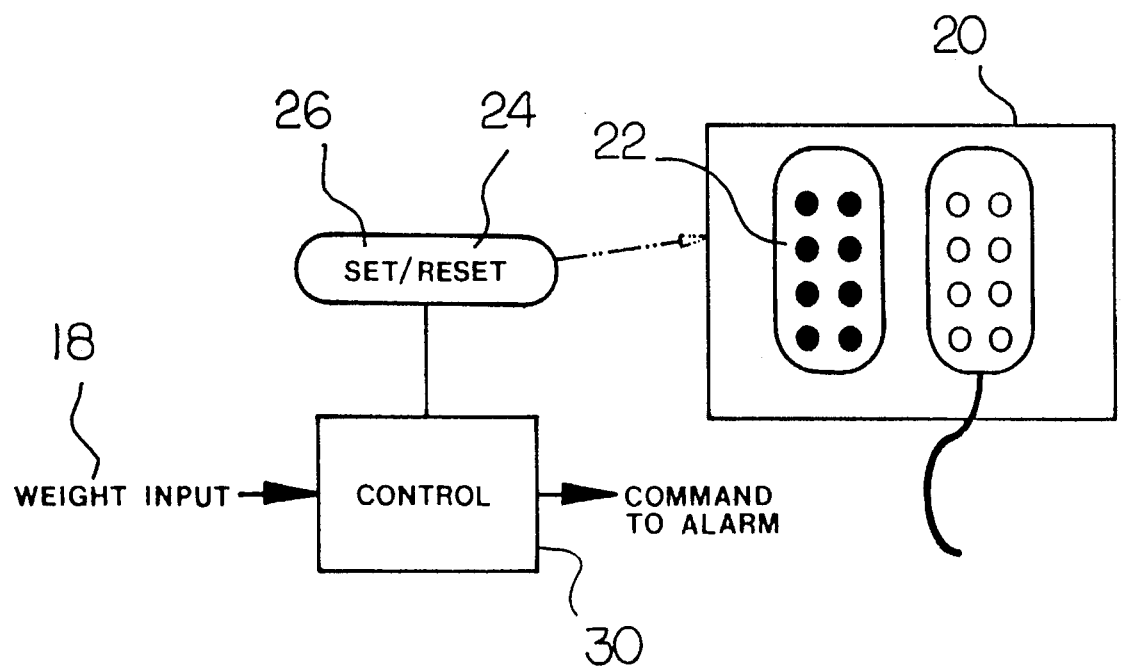
FIG. 4 depicts a block diagram of the weight recognizer component of the present invention depicting the functional representations of the key receiving circuitry used for generating the reset and set signals and the control circuitry for generating alarm command signals.
Figure 8:
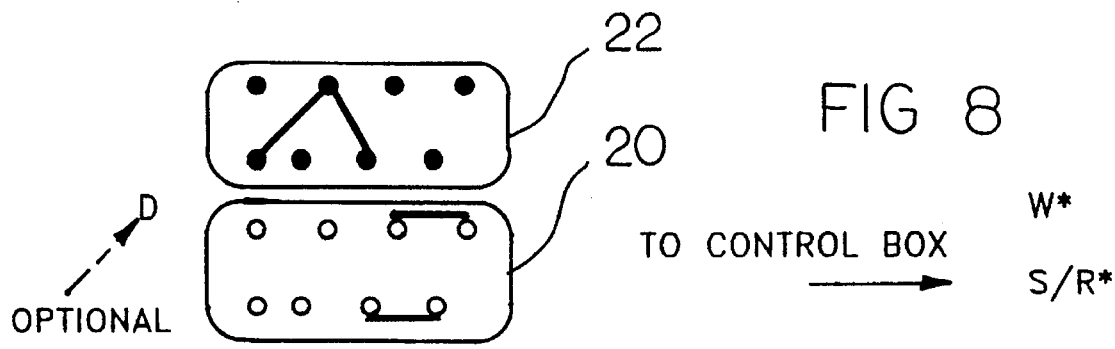
FIG. 8 depicts a connector set used by the key means to initiate transmission of reset, set, and key status ready signals.
Figure 9:
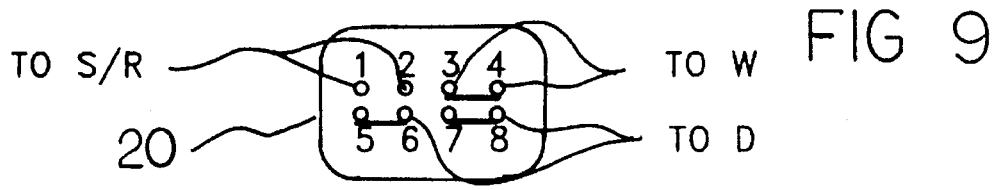
FIG. 9 depicts an example of a connector with ordered bin numbers user for transmitting reset signals, set signals, key status ready signals, and connection correct signals to the control circuitry.
Figure 10:
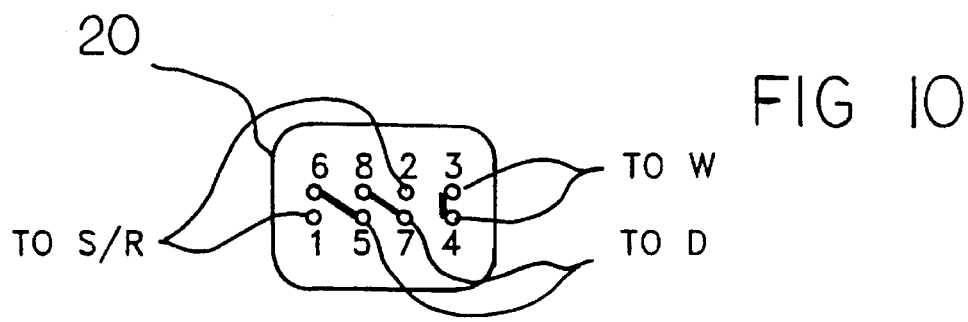
FIG. 10 depicts another example of a connector used by the key means for transmitting signals using rambled bin numbers.

In the preferred embodiment, the key receiving circuitry consists of a Set/Reset (S/R) connector. The S/R connector consists of a male and a female connectors, as depicted in FIG. 4. A reset signal is generated when the S/R connector is connected, and a set signal is generated when the S/R connector is disconnected as shown in FIG. 8. Each connector consists of N bins and there is a standard wire connection for an ordered bin number of a S/R connector set. From this standard, a different S/R connector set can be generated by rambling the position of bin numbers randomly. There are N factorial different way of combinations. A plurality of different combinations of connections can be created with the S/R connector for each different device as shown in FIG. 9 and 10. A key status ready signal is activated for generating a command alarm signal when the connection between the key receiving circuitry and control circuitry is broken. In the preferred embodiment, S/R=1 when connected (reset signal/mode). S/R=0 when disconnected (set signal/mode) or incorrectly connected. W=1 At all times; change to 0 only when the wire is cut off.

Figure 7:
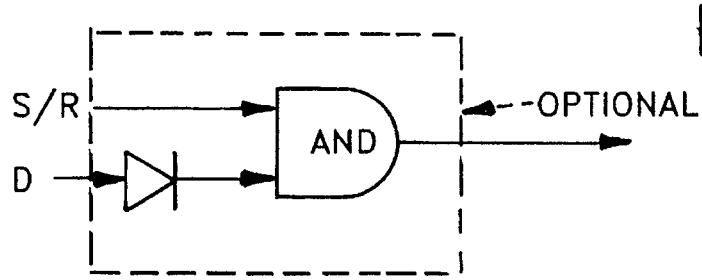
FIG. 7 depicts an alternate embodiment of a portion of circuitry of FIG. 5 used to further control reset and set operations based on proper connector connections.

An alternate embodiment of the key receiving circuitry employs a configuration signal. This configuration signal indicates when a proper key connection has been made (see FIGS. 5 and 7) with the key receiving circuitry. In this alternate embodiment, the signal D=0, when the key is correctly connected, and D=1 when the key is incorrectly connected.

To operate the present invention, a user gets in the vehicle, sits on the driver seat, turns the power on, and connects the S/R connector within the key receiving means to reset the system. Now, the user just disconnects the S/R connector, and the device is now armed and activated. A user should now place the S/R connector in a safe place and use it only if the device needs to be reset, i.e., when allowing someone else to use the car.

Figure 6:
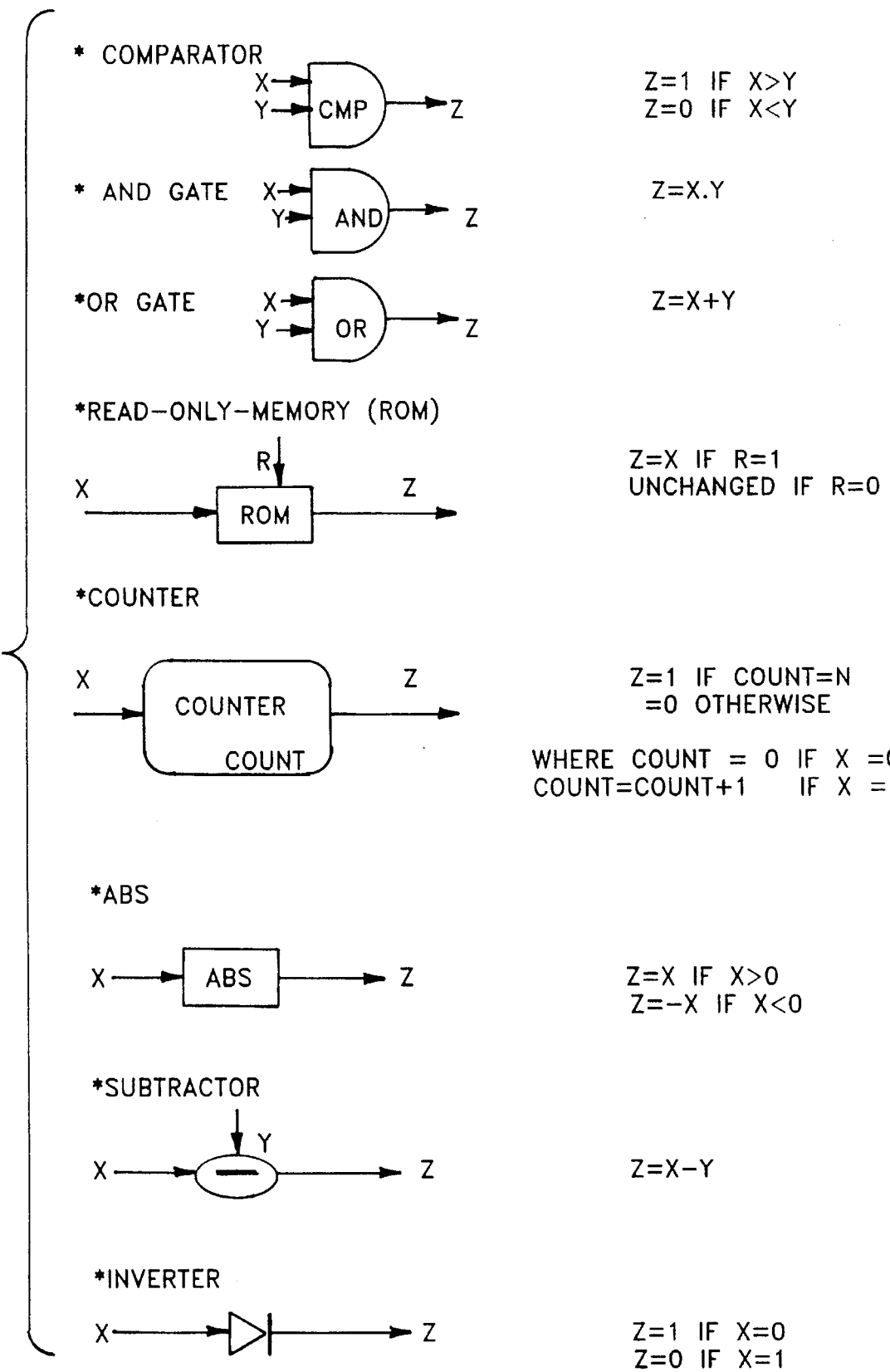
FIG. 6 depicts the basic function and operation of the components of FIG. 5.

The control circuitry performs a variety of operations in the preferred embodiment. When the control circuitry receives a reset signal that transitions to a set signal (by disconnecting the S/R connector), it reads the active weight from the measurement circuitry and stores it as the recognizing weight. When receiving a set signal, the control circuitry reads the active weight and compares it to the recognizing weight. If the difference is not within a specified range and the active weight exists, then after a pre-determined time period, with the period used for screening false alarms, the alarm command signal is activated. If the wire connecting the control circuitry to the S/R connector is cut off, activate the alarm command signal is activated. FIG. 4 shows a simplified block diagram of the control box which consists of the basic components in FIG. 6.

The alarms means activates an alarm or executes pre-determined instructions when the alarm command signal is received. The alarm can be automatically turned off a after pre-determined amount of time after activation thereof or upon the receipt of a deactivation signal. In the present invention, commercially available alarms can be used with some modifications.

Figure 5:
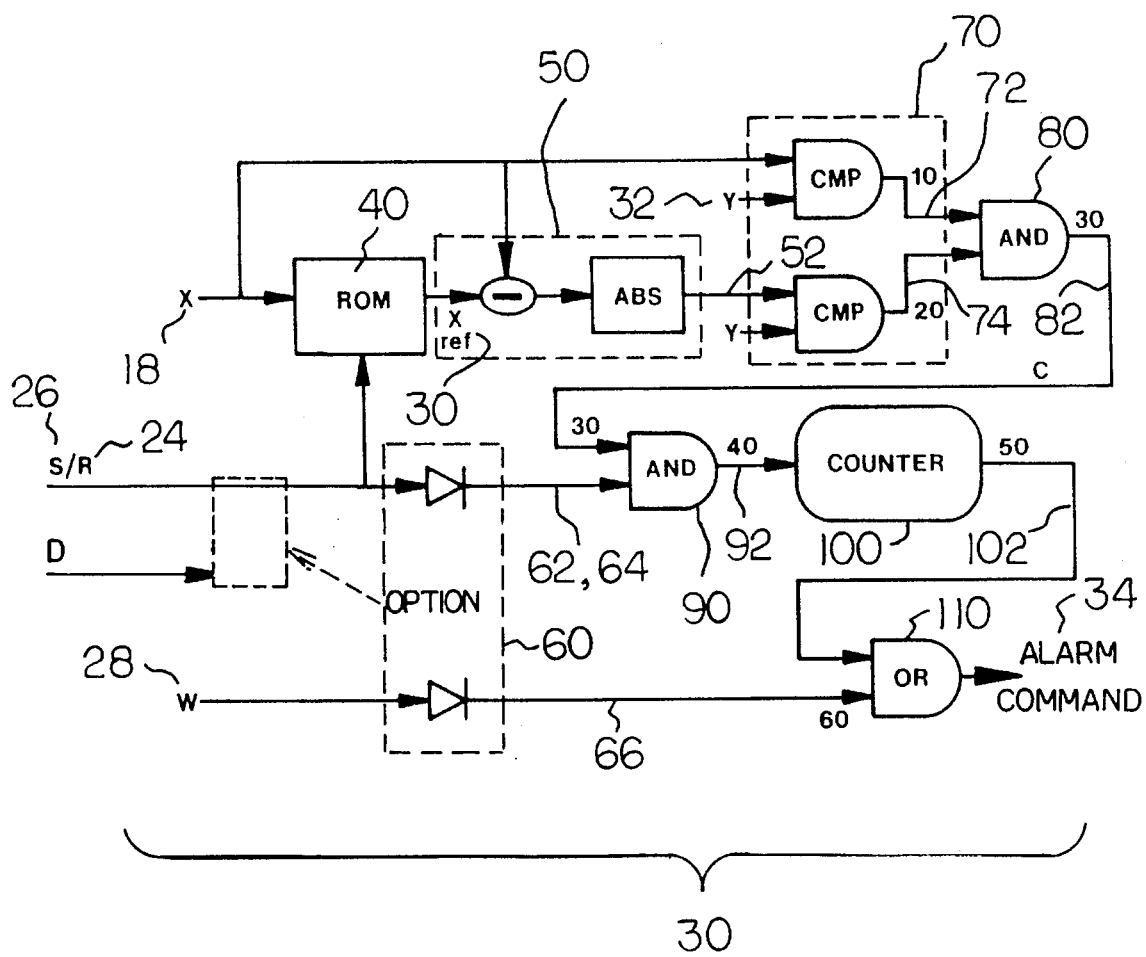
FIG. 5 depicts a simplified block diagram of the control circuitry.

Referring to FIG. 5, the logical tables of operations are described:

TABLE 1

| | Logical table for output 30 | | | |
|---|---|---|---|---|
| X(weight) | 10 | 20 | 30(C) | Status |
| ? | 0 | 0 | 0 | no existence |
| No weight | 0 | 1 | 0 | parked car (no driver) |
| Correct Weight | 1 | 0 | 0 | authorized person |
| Failed Weight | 1 | 1 | 1 | unauthorized person |

Therefore, 30(C)=1 leads to a failed weight.

TABLE 2

| | Logical table for output 40 and 50 | | | |
|---|---|---|---|---|
| S/R | 30(C) | 40 | Status | 50 |
| 0 | 0 | 0 | Correct weight | 0 |
| 0 | 1 | 1 | Failed weight | Start counting (or timing) |
| 1 | 0 | 0 | Reset mode | 0 |
| 1 | 1 | 0 | Reset mode | 0 |

Signal 40 turned to "11" leads to a failed weight; Signal 50 (counter) then starts to count failings (or timing). This counter is necessarily to account for false alarms caused by vibrations of measurement of weight due to roughness of the road condition, or movements of the driver. By extending the counting, this counter can also be served as a delay to allow a car-jacker get away for a while before activating the alarm (or turn off the ignition power to the stolen vehicle).

TABLE 3

| | Logical table for the output command. | | |
|---|---|---|---|
| 50 | 60 (W') | Output | Status |
| 0 | 0 | 0 | Correct weight |
| 0 | 1 | 1 | wire cut off → alarm/command |
| 1 | 0 | 1 | Failed weight → alarm/command |
| 1 | 1 | 1 | wire cut off → alarm/command |

Note: A command/alarm is a prestored instruction which executes either one or a combination of the following:
1. Turn off the ignition power.
2. Activate alarm
3. Send out a silence alarm signal to some designated places.

Figure 11:
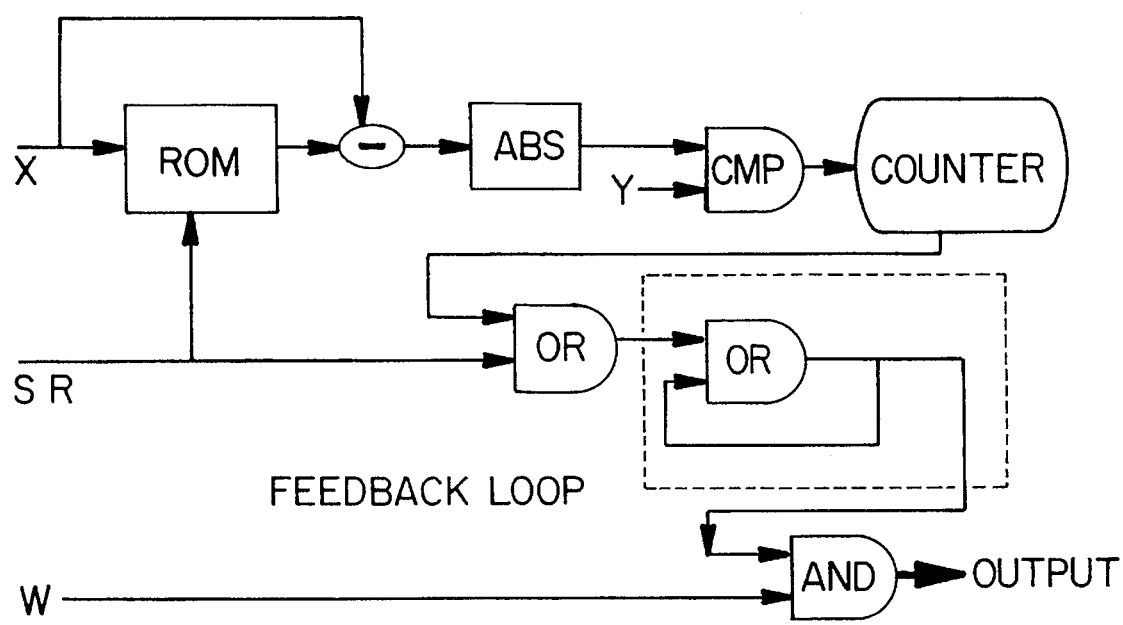
FIG. 11 depicts a final alternate embodiment of the invention illustrating another simplified block diagram of the control box. In such FIG. 11, X is the input measurement of the weight; Y is a constant, to be determined by laboratory testing; S/R is a set or reset; and W is wire condiuctivity. If output =1, connect the secondary switch.

FIG. 11 is another version of the control box of the anti-car jacking/theft device. The operations of this version are as follow:

1. It is used as a secondary switch that connects in serial to the ignition power key.

2. If the active weight matched with the reference weight, the switch is connected. Once the engine is on, it is connected until the engine is off again. This is done by the feedback loop.

Some trade offs between this FIG. 11 version and the original are:

1. The original monitors the device at all times. Therefore, in order to build and test the device, we must account for the vibration of the weight due to roughness of the road conditions. This requires a careful testing.

2. This version monitors the device only when someone tries to start the engine. Therefore, the vibration of the weight is relatively small because the car is not moving. But it can not prevent a car-jacker from getting away when a car jacking happened. However, this jacker will not be able to start the engine again, once the engine was turned off.

Note is taken that in FIG. 11 version, an output of 1 for circuits represents a successful or correct weight.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. An anti-car jacking/theft device for detecting an unauthorized person who is attempting to operate a vehicle and activating an alarm comprising, in combination:

measurement circuitry adapted to be coupled to a driver's seat of the vehicle for transmitting an input weight signal indicating a person's weight when a person sits on the driver's seat;

key receiving circuitry adapted for receiving a user-supplied key and transmitting a reset signal when the key is coupled therewith, a set signal when the key is de-coupled therefrom, and a key status ready signal having one mode indicating that the key receiving circuitry is active and another mode indicating that the key receiving circuitry is inactive;

control circuitry for receiving the input weight signal from the measurement circuitry and the reset signal, set signal, and key status ready signal from the key receiving circuitry, comparing the input weight signal with a resident reference weight signal and a resident input threshold signal with the control circuitry having one mode for transmitting an alarm command signal indicating that an unauthorized weight is detected at the measurement circuitry and another mode for transmitting the alarm command signal indicating that the key receiving circuitry is inactive, the control circuitry further comprising:

read-only-memory circuitry for receiving and storing the input threshold signal and the input weight signal as the reference weight signal with the read-only-memory circuitry having one mode for transmitting the reference weight signal based on the receipt of the set signal and another mode for transmitting the reference weight signal based on the receipt of the reset signal;

arithmetic circuitry for receiving the input weight signal and reference weight signal and transmitting a weight difference signal based on the absolute difference between the input weight signal and reference weight signal;

inverter circuitry for receiving the reset signal, the set signal, and the key status ready signal and transmitting an inverted reset signal, an inverted set signal, and an inverted key status signal;

comparator circuitry for receiving the input threshold signal, comparing the level of the input threshold signal to the levels of the input weight signal and the weight difference signal, and transmitting a first indication signal and a second indication signal based on the comparisons;

first conjunctive circuitry for receiving the first indication signal and the second indication signal and transmitting a first conjunctive indication signal based on the levels of the first indication signal and the second indication signal;

second conjunctive circuitry having one mode for receiving the first conjunctive indication signal and the inverted reset signal and transmitting a second conjunctive indication signal based on the levels of the first conjunctive indication signal and the inverted reset signal and another mode for receiving the first conjunctive indication signal and the inverted set signal and transmitting a second conjunctive indication signal based on the levels of the first conjunctive indication signal and the inverted set signal;

counter circuitry for receiving the second conjunctive indication signal and transmitting a detection signal provided the second conjunctive indication signal is received for a given period of time; and selection circuitry for receiving the detection signal and inverted key status ready signal and having one mode for transmitting the alarm command signal when the detection signal is received, whereby indicating that the unauthorized weight is detected at the measurement circuitry, and another mode for transmitting the alarm command signal when the inverted key status ready signal is received, whereby indicating that the key receiving circuitry is inactive;

alarm means for receiving the alarm command signal and activating the alarm;

power transmission means for energizing the measurement circuitry, key receiving circuitry, and control circuitry; and switch means coupled between the power transmission means and the measurement circuitry, key receiving circuitry, and control circuitry, the switch means having one orientation for activating the measurement circuitry, key receiving circuitry, and control circuitry and another orientation for deactivating the measurement circuitry, key receiving circuitry, and control circuitry.

2. An anti-car jacking/theft device for detecting an unauthorized person who is attempting to operate a vehicle and activating an alarm comprising, in combination:

measurement means adapted to be coupled to a driver's seat of the vehicle for transmitting an input weight signal indicating a person's weight;

key receiving means adapted for receiving a user-supplied key and transmitting a reset signal when the key is activated and a set signal when the key is de-activated;

control circuitry for receiving the input weight signal from the measurement means and the reset signal and the set signal from the key receiving means, comparing the input weight signal with a resident reference weight signal and a resident input threshold signal and with the control circuitry having one mode for transmitting an alarm command signal indicating that an unauthorized weight is detected at the measurement means when the set signal is being received to thereby signify that the key receiving means is active and another mode for transmitting the alarm command signal when the reset signal is being received to thereby signify that the key receiving means is inactive; and with the control circuitry including memory circuitry for receiving and storing the reference weight signal, the input threshold signal, and the input weight signal for subsequent use;

alarm means for receiving the alarm command signal and activating an alarm when an unauthorized weight is detected and the key receiving means is active; and a power source for energizing and de-energizing the measurement circuitry, key receiving circuitry, and control circuitry.

* * * * *